(12) United States Patent
Hasegawa et al.

(10) Patent No.: US 9,126,838 B2
(45) Date of Patent: Sep. 8, 2015

(54) METHOD FOR PURIFYING CHLOROSILANES

(75) Inventors: Masayuki Hasegawa, Niigata (JP); Yoichi Tonomura, Niigata (JP); Tohru Kubota, Niigata (JP); Takeshi Aoyama, Niigata (JP); Shuji Tanaka, Niigata (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 163 days.

(21) Appl. No.: 13/822,673

(22) PCT Filed: Sep. 2, 2011

(86) PCT No.: PCT/JP2011/004937
§ 371 (c)(1),
(2), (4) Date: Mar. 13, 2013

(87) PCT Pub. No.: WO2012/056621
PCT Pub. Date: May 3, 2012

(65) Prior Publication Data
US 2013/0177492 A1 Jul. 11, 2013

(30) Foreign Application Priority Data
Oct. 27, 2010 (JP) .................. 2010-240285

(51) Int. Cl.
C01B 33/08 (2006.01)
C01B 33/107 (2006.01)

(52) U.S. Cl.
CPC ....... *C01B 33/10794* (2013.01); *C01B 33/1071* (2013.01); *C01B 33/10763* (2013.01); *C01B 33/10778* (2013.01)

(58) Field of Classification Search
USPC ....................................... 423/342
See application file for complete search history.

(56) References Cited

U.S. PATENT DOCUMENTS

| 2,821,460 A | 1/1958 | Whelan et al. |
| 3,126,248 A | 3/1964 | Pohl et al. |

(Continued)

FOREIGN PATENT DOCUMENTS

| DE | 1 289 834 | 2/1969 |
| EP | 2 033 937 A2 | 3/2009 |

(Continued)

OTHER PUBLICATIONS

Kabalka et al., "The use of organoboron chlorides and bromides in organic synthesis", Journal of Organometallic Chemistry 680 (2003) 12-22.*

(Continued)

*Primary Examiner* — Jennifer A Smith
*Assistant Examiner* — Anita Nassiri Motlagh
(74) *Attorney, Agent, or Firm* — Oblon, McClelland, Maier & Neustadt, L.L.P.

(57) ABSTRACT

The method comprises at least three steps of a hydrogenation step (101) and/or a chlorination step (102), an impurity conversion step (103), and a purification step (104). In the impurity conversion step (103), an aldehyde compound represented by the general formula Ar—R—CHO (Ar; denotes a substituted or unsubstituted aryl group, R; denotes an organic group having two or more carbon atoms) is added to convert donor impurities and acceptor impurities contained in a chlorosilane distillate to a high-boiling substance. The chlorosilane distillate after the donor impurities and acceptor impurities have been converted to a high-boiling substance is sent to the purification step (104). In the purification step (104), high purity chlorosilanes from which the donor impurities and acceptor impurities have been thoroughly removed are obtained by using a distillation column or the like, where the high purity chlorosilanes are recovered outside the system from the top of the column.

17 Claims, 9 Drawing Sheets

(56) References Cited

U.S. PATENT DOCUMENTS

| | | | |
|---|---|---|---|
| 3,252,752 | A | 5/1966 | Pohl et al. |
| 4,112,057 | A | 9/1978 | Lang et al. |
| 4,676,967 | A | 6/1987 | Breneman |
| 2009/0068081 | A1 | 3/2009 | Uehara et al. |

FOREIGN PATENT DOCUMENTS

| | | |
|---|---|---|
| EP | 2 036 858 A2 | 3/2009 |
| JP | 57 34012 | 2/1982 |
| JP | 58 500895 | 6/1983 |
| JP | 58 161915 | 9/1983 |
| JP | 58 217422 | 12/1983 |
| JP | 4 300206 | 10/1992 |
| JP | 2001 2407 | 1/2001 |
| JP | 2005 67979 | 3/2005 |
| JP | 2008 532907 | 8/2008 |
| JP | 2009 62213 | 3/2009 |

OTHER PUBLICATIONS

International Search Report Issued Nov. 22, 2011 in PCT/JP11/004937, Filed Sep. 2, 2011.

Combined Office Action and Search Report issued Jul. 7, 2014, in Chinese Patent Application No. 201180052072.5 with English translation of category of cited documents.

Extended European Search Report issued Oct. 2, 2014, in European Patent Application No. 11835769.8.

* cited by examiner

METHOD FOR PURIFYING CHLOROSILANES

CROSS REFERENCE TO RELATED APPLICATIONS

The present application is a 35 U.S.C. §371 national stage patent application of International patent application PCT/JP2011/004937, filed on Sep. 2, 2011, published as WO/2012/056621 on May 3, 2012, the text of which is incorporated by reference, and claims the benefit of the filing date of Japanese application no. 2010-240285, filed on Oct. 27, 2010, the text of which is also incorporated by reference.

TECHNICAL FIELD

The present invention relates to a method for purifying chlorosilanes, more particularly to a method for efficiently removing donor impurities and acceptor impurities contained in chlorosilanes to obtain high purity chlorosilanes.

BACKGROUND ART

Semiconductor-grade high purity polycrystalline silicon is generally produced by a CVD method referred to as the "Siemens method" by using a chlorosilane gas mainly comprising trichlorosilane as a raw material in the presence of hydrogen. Therefore, it is required that chlorosilanes used as a raw material of high purity polycrystalline silicon should also have an extremely high purity.

In particular, when the impurities contained in raw material chlorosilanes are impurities such as phosphorus and arsenic which serve as a donor in a silicon crystal or impurities such as boron and aluminum used as an acceptor therein, even a very small amount of these impurities will result in having significant influence on the electrical properties (resistivity) of polycrystalline silicon produced. Therefore, practically, it will be considerably meaningful to provide a technique of efficiently removing donor impurities and acceptor impurities contained in raw material chlorosilanes to thereby highly purify the raw material chlorosilanes.

Generally, chlorosilanes for producing polycrystalline silicon are produced by first obtaining a chlorosilane distillate from a metallurgical-grade silicon (so-called metal-grade silicon, hereinafter referred to as "metal silicon") which contains a relatively large amount of impurities by a publicly known method and then purifying the chlorosilane distillate by a method such as distillation to further highly purify the same.

However, the donor impurities and acceptor impurities as described above are generally contained in metal silicon in an amount in the order of several hundred ppb (atomic) to several hundred ppm (atomic) in terms of the atomic ratio. Therefore, these impurities are not sufficiently removed in the processes of purifying the chlorosilane distillate, but the donor impurities and acceptor impurities may remain in the chlorosilanes finally obtained, which may pose a problem in that such residual impurities may reduce the quality of polycrystalline silicon.

As a method for obtaining a chlorosilane distillate, there is known a hydrogenation step of reacting a tetrachlorosilane ($SiCl_4$)-containing material with hydrogen in the presence of metal silicon to obtain a chlorosilane distillate containing trichlorosilane ($SiHCl_3$) (for example, refer to National Publication of International Patent Application No. 2008-532907 (Patent Literature 1), Japanese Patent Laid-Open No. 58-217422 (Patent Literature 2), Japanese Patent Laid-Open No. 58-161915 (Patent Literature 3), and the like).

This hydrogenation reaction proceeds according to the following reaction formula.

$$3SiCl_4 + 2H_2 + Si \rightarrow 4SiHCl_3 \quad \text{[Formula 1]}$$

The chlorosilane distillate is a fraction of crude chlorosilanes which are the products synthesized by the hydrogenation reaction, and is generally a mixture mainly comprising chlorosilanes such as dichlorosilane ($SiH_2Cl_2$), trichlorosilane ($SiHCl_3$), and tetrachlorosilane ($SiCl_4$).

As another method for obtaining the chlorosilane distillate, there is also known a chlorination step of performing a chlorination reaction by bringing metal silicon into contact with hydrogen chloride in the presence of a catalyst to obtain a chlorosilane distillate containing trichlorosilane (for example, refer to Japanese Patent Laid-Open No. 2005-67979 (Patent Literature 4)).

This chlorination reaction proceeds according to the following reaction formula.

$$Si + 3HCl \rightarrow SiHCl_3 + H_2 \quad \text{[Formula 2]}$$

The chlorosilane distillate is a fraction of crude chlorosilanes which are the products synthesized by the chlorination reaction, and also in this case, the chlorosilane distillate is generally a mixture mainly comprising chlorosilanes such as dichlorosilane, trichlorosilane, and tetrachlorosilane.

The donor impurities and acceptor impurities contained in metal silicon are hydrogenated or chlorinated at the same time when crude chlorosilanes are produced, and are probably mixed into the crude chlorosilanes as a form of compounds having various structures. Such crude chlorosilanes are purified to obtain high purity chlorosilanes, but it is difficult to separate and remove these impurities by a common distillation method when the boiling points of the compounds of the donor impurities and acceptor impurities are close to the boiling point of trichlorosilane.

If polycrystalline silicon is produced by using chlorosilanes from which the donor impurities and acceptor impurities have been insufficiently removed as a raw material, the result will be that a polycrystalline silicon having desired properties cannot be obtained.

Under these circumstances, various methods have been proposed as a method for removing the donor impurities and acceptor impurities in the chlorosilane distillate. For example, there has been proposed a method of adding organic matter to a chlorosilane distillate to produce an adduct with donor impurities and acceptor impurities, followed by distillation and purification to obtain high purity chlorosilanes.

Specifically, Japanese Patent Laid-Open No. 2005-67979 (Patent Literature 4) discloses a method of adding an ether to chlorosilanes, followed by distillation and purification. Further, U.S. Pat. No. 3,126,248 (Patent Literature 5) discloses a method of adding an organic compound comprising dioxane, benzaldehyde, methyl ethyl ketone, dimethylglyoxime, and valerolactone to remove impurities. Furthermore, Japanese Patent Laid-Open No. 2009-62213 (Patent Literature 6) discloses a method of reacting chlorosilanes with oxygen in the presence of benzaldehyde to convert impurities to a high-boiling-point compound and distilling the chlorosilanes after the treatment to separate the high-boiling-point compound of the impurities from the chlorosilanes.

There has been also proposed a method of adding a metal chloride to a chlorosilane distillate to produce an adduct with donor impurities and acceptor impurities, followed by distillation and purification to obtain high purity chlorosilanes.

Specifically, U.S. Pat. No. 2,821,460 (Patent Literature 7) discloses a method of adding an aluminum chloride to chlorosilanes to form an $AlCl_3 \cdot PCl_5$ complex, followed by distillation and purification. Further, Japanese Patent Laid-Open No. 04-300206 (Patent Literature 8) discloses a method of adding an aqueous solution of inorganic salt such as $TiCl_4$ in a high concentration to hydrolyze impurities to convert the impurities to a high-boiling-point compound, followed by distillation and purification.

There has been also proposed a method of adsorbing impurities contained in chlorosilanes to alumina, silica gel, activated carbon, or the like to thereby remove the impurities.

Specifically, U.S. Pat. No. 3,252,752 (Patent Literature 9) discloses a method of immobilizing a substance having a lone pair of electrons (for example, a substance such as propionitrile having a nitrogen atom and benzaldehyde having an oxygen atom) on an adsorbent such as activated carbon and silica gel and therethrough passing a chlorosilane gas to capture and remove impurities. Further, German Patent No. 1,289,834 (Patent Literature 10) discloses a method of bringing chlorosilanes in a state of liquid or vapor into contact with activated alumina to remove impurities. Furthermore, U.S. Pat. No. 4,112,057 (Patent Literature 11) discloses a method of bringing chlorosilanes into contact with metal oxides such as hydrated silica gel and alumina gel to remove impurities; and Japanese Patent Laid-Open No. 2001-2407 (Patent Literature 12) discloses a method of bringing chlorosilanes into contact with an alkali or alkaline earth fluoride salt to remove impurities.

Besides these methods, there has been proposed a method of obtaining chlorosilanes having a low impurity concentration by introducing a small amount of oxygen into chlorosilanes in a high temperature condition to react them with each other to form a complex; reacting the complex with donor impurities and acceptor impurities to form a new complex; and separating the new complex in a distillation step of chlorosilanes (refer to National Publication of International Patent Application No. 1983-500895 (Patent Literature 13)).

CITATION LIST

Patent Literature

Patent Literature 1
National Publication of International Patent Application No. 2008-532907
Patent Literature 2
Japanese Patent Laid-Open No. 58-217422
Patent Literature 3
Japanese Patent Laid-Open No. 58-161915
Patent Literature 4
Japanese Patent Laid-Open No. 2005-67979
Patent Literature 5
U.S. Pat. No. 3,126,248
Patent Literature 6
Japanese Patent Laid-Open No. 2009-62213
Patent Literature 7
U.S. Pat. No. 2,821,460
Patent Literature 8
Japanese Patent Laid-Open No. 04-300206
Patent Literature 9
U.S. Pat. No. 3,252,752
Patent Literature 10
German Patent No. 1,289,834
Patent Literature 11
U.S. Pat. No. 4,112,057
Patent Literature 12
Japanese Patent Laid-Open No. 2001-2407
Patent Literature 13
National Publication of International Patent Application No. 1983-500895

SUMMARY OF INVENTION

Technical Problem

Among the conventional purification methods as described above, the method of adding organic matter or a metal chloride to a chlorosilane distillate to produce an adduct with donor impurities and acceptor impurities allows chlorosilanes to be purified with high purity by a subsequent distillation step, when a boiling point difference arises between the adduct and trichlorosilane which is the main component.

However, as described also in the prior art literatures as listed above, the organic matter which exhibits an effect to remove impurities in the purification method of adding the organic matter to a chlorosilane distillate is the organic matter containing an element having a lone pair of electrons, which poses a considerable limitation to the selection of such organic matter.

For example, the organic matter to be added must not be the one that is very easily decomposed in the purification step and is also required not to produce a product which has a boiling point that is close to the boiling point of chlorosilanes by a reaction with a substance in the chlorosilane distillate. Particularly, when the organic matter containing an element having a lone pair of electrons is a solid, it is necessary to study whether it is soluble at a temperature for handling the chlorosilane distillate or not, and whether it is precipitated by the operating conditions during the handling thereof, and the like; and a sufficient consideration to prevent the incorporation of water during the charge is also necessary. That is, it is necessary to carefully select organic matter that is effective in removing impurities after taking the various conditions of the purification step into consideration.

Benzaldehyde ($C_6H_5CHO$) is known as organic matter containing an element having a lone pair of electrons that is effective in removing donor impurities and acceptor impurities (refer to Patent Literature 5, Patent Literature 6, and Patent Literature 9). Benzaldehyde is easily handled at the time of addition thereof and is also easily available, but benzaldehydes form a solid polymer according to the following reaction formula in the presence of a metal chloride such as iron chloride. Since such a polymer may solidify and produce a blocker in piping or a vessel, it is necessary to periodically stop the production facilities in order to remove the solid.

[Formula 3]

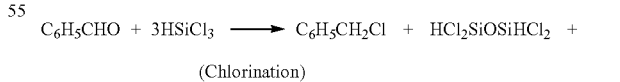

(Chlorination)

[Formula 4]

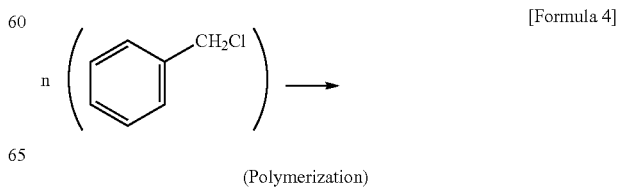

(Polymerization)

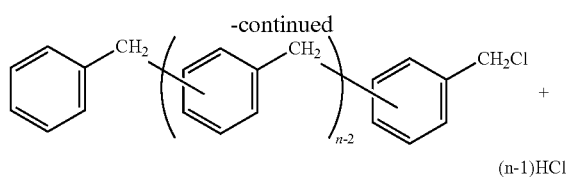

$(n-1)\text{HCl}$

The purification method of adding a metal chloride to the chlorosilane distillate cannot be said that the handling is easy and poses such a problem in that waste treatment is complicated.

The method of adsorbing impurities contained in chlorosilanes on alumina, silica gel, activated carbon, or the like to thereby remove the impurities requires an apparatus such as an adsorption column, leading to complicated facilities; and in addition, the method poses such problems in that an adsorbent carrying method is not simple, or handling and waste treatment of the adsorbent after the breakthrough are complicated.

Also in other methods for removing impurities, it is necessary to introduce a small amount of oxygen into chlorosilanes in a high temperature condition to react them with each other at high temperatures, and these methods have various problems such as the reaction cannot be operated under simple and moderate conditions.

The present invention has been made in view of the problems of conventional methods for purifying chlorosilanes as described above, and an object of the present invention is to provide a technique of removing donor impurities and acceptor impurities from a chlorosilane distillate to reduce the content of these impurities.

Solution to Problem

A method for purifying chlorosilanes according to the present invention comprises the following steps (A) to (C):

(A) a hydrogenation step of reacting chlorosilanes mainly comprising tetrachlorosilane with hydrogen in the presence of a metal-grade silicon to obtain a chlorosilane distillate containing trichlorosilane, or a chlorination step of reacting a metal-grade silicon with hydrogen chloride to obtain a chlorosilane distillate containing trichlorosilane;

(B) an impurity conversion step of treating the chlorosilane distillate obtained in the hydrogenation step or chlorination step (A) in the presence of an aldehyde compound represented by the general formula Ar—R—CHO (wherein Ar denotes a substituted or unsubstituted aryl group, and R denotes an organic group having two or more carbon atoms) to convert donor impurities and acceptor impurities contained in the chlorosilane distillate to a high-boiling substance; and (C) a purification step of separating electronic-grade chlorosilanes from the chlorosilane distillate which has been subjected to the impurity conversion step and recovering the electronic-grade chlorosilanes outside the system.

The present invention may include an embodiment further comprising the following step (D):

(D) a residual distillate supplying step of supplying at least a part of a residual chlorosilane distillate after the electronic-grade chlorosilanes have been separated in the purification step (C) to the impurity conversion step (B) as at least a part of the aldehyde compound.

The present invention may also include an embodiment further comprising the following step (E):

(E) a high-boiling substance separation step of separating a fraction mainly comprising the aldehyde compound and chlorosilanes from a residual chlorosilane distillate after the electronic-grade chlorosilanes have been separated in the purification step (C) and supplying the fraction mainly comprising the aldehyde compound and chlorosilanes to the impurity conversion step (B) as at least a part of the aldehyde compound.

In these embodiments, the present invention may also include an embodiment further comprising the following step (F):

(F) a high-boiling fraction separation step of separating the chlorosilane distillate obtained in the hydrogenation step or chlorination step (A) into a first chlorosilane distillate mainly comprising trichlorosilane and a fraction having a boiling point lower than the boiling point of trichlorosilane and a second chlorosilane distillate mainly comprising tetrachlorosilane and a fraction having a boiling point higher than the boiling point of tetrachlorosilane, and supplying the first chlorosilane distillate to the impurity conversion step (B).

In this case, the present invention may also include an embodiment further comprising the following step (G):

(G) a step of further separating the first chlorosilane distillate into a distillate mainly comprising trichlorosilane and a distillate mainly comprising a fraction having a boiling point lower than the boiling point of trichlorosilane, and supplying the distillate mainly comprising trichlorosilane to the impurity conversion step (B).

As another embodiment, the present invention may also include an embodiment further comprising the following step (H):

(H) a low-boiling fraction separation step of separating the chlorosilane distillate obtained in the hydrogenation step or chlorination step (A) into a third chlorosilane distillate mainly comprising a fraction having a boiling point lower than the boiling point of trichlorosilane and a fourth chlorosilane distillate mainly comprising trichlorosilane and a fraction having a boiling point higher than the boiling point of trichlorosilane, and supplying the fourth chlorosilane distillate to the impurity conversion step (B).

In this case, the present invention may also include an embodiment further comprising the following step (I):

(I) a step of further separating the fourth chlorosilane distillate into a distillate mainly comprising trichlorosilane and a distillate mainly comprising a fraction having a boiling point higher than the boiling point of trichlorosilane, and supplying the distillate mainly comprising trichlorosilane to the impurity conversion step (B).

The treatment temperature in the impurity conversion step (B) is preferably 0° C. or higher and 150° C. or lower.

Further, the impurity conversion step (B) is preferably performed by adding the aldehyde compound represented by the general formula Ar—R—CHO in an amount equal to or more than the stoichiometric amount of the donor impurities and acceptor impurities contained in the chlorosilane distillate.

The aldehyde compound represented by the general formula Ar—R—CHO may include one represented by the following structural formula. Here, in the following structural formula, Ar denotes a substituted or unsubstituted aryl group, and R1 and R2 each denote hydrogen or a hydrocarbon group having 1 to 20 carbon atoms.

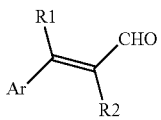

[Formula 5]

The aldehyde compound represented by the above structural formula is, for example, a cinnamaldehyde derivative.

Examples of the cinnamaldehyde derivative include cinnamaldehyde, α-methylcinnamaldehyde, α-pentylcinnamaldehyde, α-hexylcinnamaldehyde, p-isopropyl-α-methylhydrocinnamaldehyde, and p-tert-butyl-α-methylhydrocinnamaldehyde.

The electronic-grade chlorosilanes purified by the present invention are useful as a raw material, for example, for producing polycrystalline silicon for semiconductor applications, for producing polycrystalline silicon for solar cell applications, for forming a silicon oxide film, for forming a polycrystalline silicon film, for forming a silicon compound thin film, or for producing an epitaxial wafer.

Advantageous Effects of Invention

The method for purifying chlorosilanes according to the present invention comprises at least three steps of a hydrogenation step and/or a chlorination step, an impurity conversion step, and a purification step. In the impurity conversion step, an aldehyde compound represented by the general formula Ar—R—CHO (wherein Ar denotes a substituted or unsubstituted aryl group, and R denotes an organic group having two or more carbon atoms) is added to convert donor impurities and acceptor impurities contained in a chlorosilane distillate to a high-boiling substance. The chlorosilane distillate after the donor impurities and acceptor impurities have been converted to a high-boiling substance is sent to the purification step. In the purification step, high purity chlorosilanes from which the donor impurities and acceptor impurities have been thoroughly removed are obtained by using a distillation column or the like, where the high purity chlorosilanes are recovered outside the system from the top of the column.

The technique based on the method for purifying chlorosilanes having the above-described constitution is easily handled and does not have problems such as complicated waste treatment. Further, an apparatus such as an adsorption column is not required, and the facilities will not be complicated. That is, the problems of conventional methods are eliminated.

Thus, the present invention provides a new technique of removing donor impurities and acceptor impurities from a chlorosilane distillate to reduce the content of these impurities.

DESCRIPTION OF EMBODIMENTS

Figure 1:
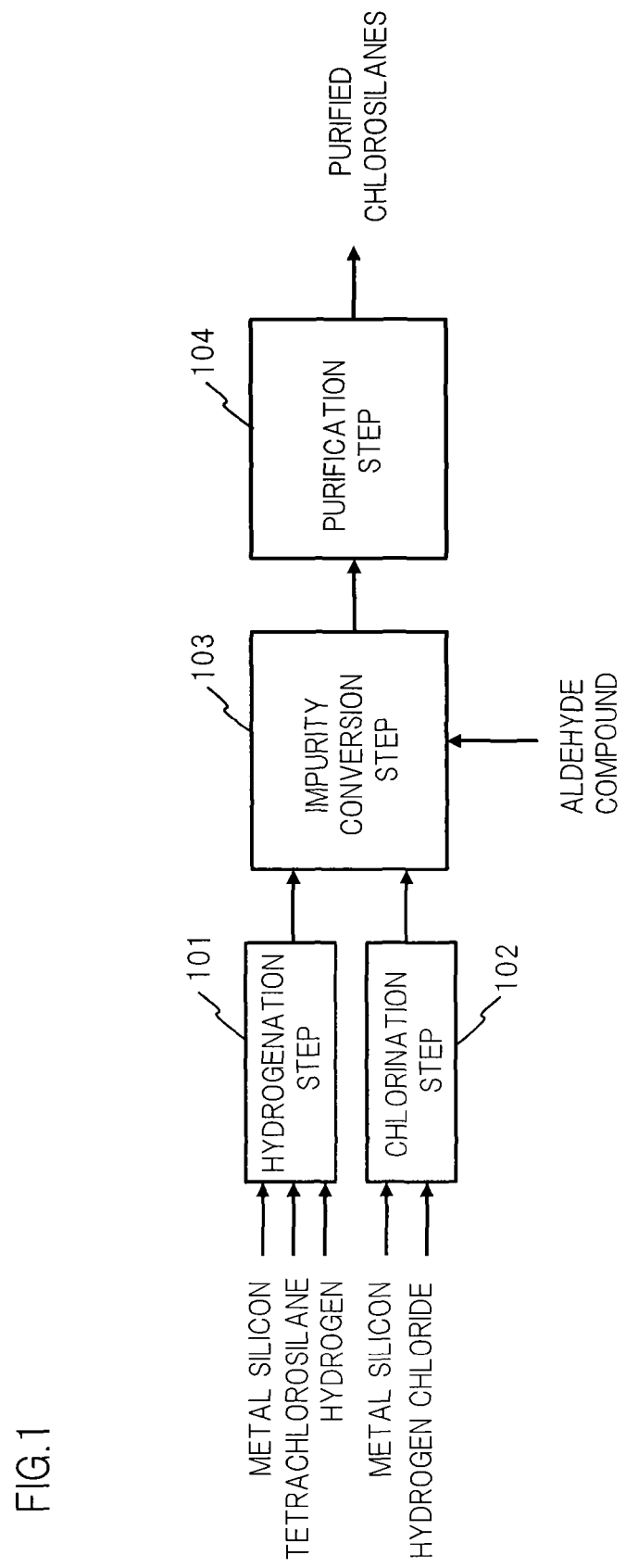
FIG. 1 is a block diagram for explaining one embodiment of a method for purifying chlorosilanes of the present invention.

Hereinafter, embodiments for performing a method for purifying chlorosilanes according to the present invention will be described.

In the present invention, chlorosilanes are purified by a hydrogenation step of reacting chlorosilanes mainly comprising tetrachlorosilane with hydrogen in the presence of a metal-grade silicon to obtain a chlorosilane distillate containing trichlorosilane or a chlorination step of reacting a metal-grade silicon with hydrogen chloride to obtain a chlorosilane distillate containing trichlorosilane, and an impurity conversion step of treating the chlorosilane distillate obtained in the hydrogenation step or chlorination step in the presence of an aldehyde compound represented by the general formula Ar—R—CHO to convert donor impurities and acceptor impurities contained in the chlorosilane distillate to a high-boiling substance, followed by separating an electronic-grade chlorosilanes from the chlorosilane distillate which has been subjected to the impurity conversion step and recovering the electronic-grade chlorosilanes outside the system. Here, in the above general formula (Ar—R—CHO), Ar denotes a substituted or unsubstituted aryl group, and R denotes an organic group having two or more carbon atoms.

The aldehyde compound represented by the general formula Ar—R—CHO may include those represented by the following structural formula. Here, in the following structural formula, Ar denotes a substituted or unsubstituted aryl group, and R1 and R2 each denote hydrogen or a hydrocarbon group having 1 to 20 carbon atoms.

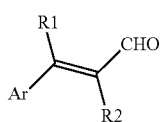

[Formula 6]

The aldehyde compound represented by the above structural formula is, for example, a cinnamaldehyde derivative, and examples include cinnamaldehyde, α-methylcinnamaldehyde, α-pentylcinnamaldehyde, α-hexylcinnamaldehyde, p-isopropyl-α-methylhydrocinnamaldehyde, and p-tert-butyl-α-methylhydrocinnamaldehyde.

The present invention not only allows purification of semiconductor grade chlorosilanes having sufficiently high purity that are used, for example, for producing high purity polycrystalline silicon, but also allows continuous operation of production facilities because a solid polymer which is a material resulting from the reactions shown in the above [Formula 3] and [Formula 4] is not produced.

The aldehyde compound represented by Ar—R—CHO as described above is chlorinated in the presence of metal chloride such as iron chloride, as in the case of benzaldehydes. For example, cinnamaldehyde is chlorinated by the reaction according to the following formula.

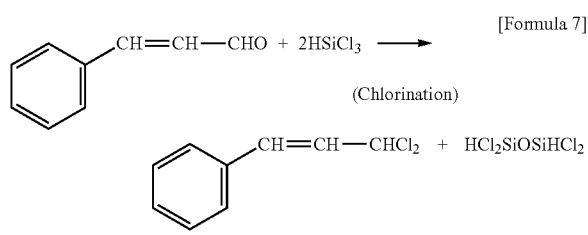

[Formula 7]

(Chlorination)

However, even if a substance in which the aldehyde part has been chlorinated is produced, this substance undergoes intramolecular reaction of the molecule itself by the reaction according to the following formula, unlike benzaldehydes that react only with other molecules, and therefore, this substance hardly forms a polymer and will not probably results in forming a solid.

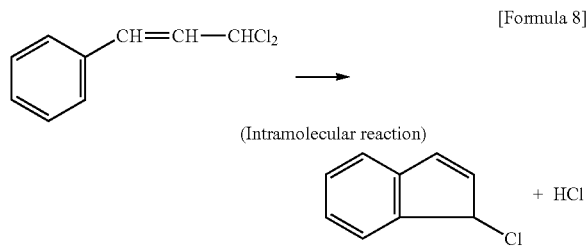

[Formula 8]

(Intramolecular reaction)

That is, from the point of view of industrial production, a remover of the donor impurities and acceptor impurities contained in the chlorosilane distillate is preferably a compound containing an aldehyde group, and a substance that undergoes intramolecular reaction not to thereby be polymerized even when the aldehyde part in the compound is chlorinated.

The aldehyde compound represented by Ar—R—CHO as described above has a feature in that it has an organic group having two or more carbon atoms between the aryl group and the aldehyde group, unlike benzaldehydes. That is, since the aldehyde compound represented by the general formula Ar—R—CHO has an organic group represented by R, it can form an intramolecular reaction with a benzene ring, and is considered to show a feature in that a polymer is hardly formed.

Hereinafter, specific embodiments for performing the method for purifying chlorosilanes according to the present invention will be described with reference to drawings.

First Embodiment

FIG. 1 is a block diagram for explaining one embodiment of the method for purifying chlorosilanes of the present invention. The method for purifying chlorosilanes shown in this figure comprises at least three steps of a hydrogenation step 101 and/or a chlorination step 102, an impurity conversion step 103, and a purification step 104. The method may comprise only one or both of the hydrogenation step 101 and the chlorination step 102 depending on the requirements of the system.

In the hydrogenation step 101, metal silicon, chlorosilanes mainly comprising tetrachlorosilane, and hydrogen are supplied, and crude chlorosilanes containing trichlorosilane are obtained. On the other hand, in the chlorination step 102, metal silicon and hydrogen chloride are supplied, and crude chlorosilanes containing trichlorosilane are obtained in the presence of a catalyst.

The crude chlorosilanes obtained in the hydrogenation step 101 or the chlorination step 102 are purified as needed and then sent to the impurity conversion step 103 as a chlorosilane distillate mainly comprising chlorosilanes such as dichlorosilane, trichlorosilane, and tetrachlorosilane.

In the impurity conversion step 103, the aldehyde compound represented by the general formula Ar—R—CHO as described above is added to the chlorosilane distillate, and donor impurities and acceptor impurities contained in the chlorosilane distillate are converted to a high-boiling substance.

The temperature during the conversion treatment to the high-boiling substance may be set to a temperature equal to the boiling point of the chlorosilane distillate or lower under the pressure in a reaction vessel, and it is common to perform the treatment at a temperature of 0° C. or higher and 150° C. or lower. It takes a long time to convert the impurities to the high-boiling substance when the treatment temperature is too low, while when the temperature is too high, it will be necessary to set the pressure in the reaction vessel to a higher value.

The amount of the aldehyde compound supplied (added) to the impurity conversion step 103 is preferably equal to or more than the stoichiometric amount of the donor impurities and acceptor impurities contained in the chlorosilane distillate.

The conversion of the donor impurities and acceptor impurities to the high-boiling substance is accelerated with the increase in the concentration of the aldehyde compound, but the necessity of recovering the aldehyde compound may occur if the feed rate of the aldehyde compound is excessive.

Therefore, the amount of the aldehyde compound supplied to the impurity conversion step 103 may be equimolar to or more than that of the donor impurities and acceptor impurities contained in the chlorosilane distillate, and may be an excessive amount to be judged to be economically rational. For example, an amount of 20% by mass or less relative to the chlorosilane distillate to be treated is enough in terms of the amount of the impurities generally contained.

The chlorosilane distillate after the donor impurities and acceptor impurities contained in the chlorosilane distillate have been converted to the high-boiling substance by the treatment in the presence of the aldehyde compound represented by the general formula Ar—R—CHO is sent to the purification step 104.

The chlorosilane distillate sent to the purification step 104 contains an excess of the aldehyde compound added in the impurity conversion step 103 and the high-boiling substance produced by the conversion of the donor impurities and acceptor impurities, in addition to the chlorosilanes containing trichlorosilane.

In the purification step 104, the separation and purification of chlorosilanes mainly comprising trichlorosilane are performed using a distillation column and the like. The contents of the chlorosilane distillate sent from the impurity conversion step 103 comprise chlorosilanes, the aldehyde compound represented by the general formula Ar—R—CHO, and the high-boiling substance derived from the donor impurities and acceptor impurities. Therefore, purified chlorosilanes can be easily obtained by using a distillation column or the like, where they are recovered outside the system from the top of the column.

The obtained chlorosilanes are high purity chlorosilanes from which the donor impurities and acceptor impurities have been thoroughly removed, and are also highly pure (electronic grade) to the extent sufficient for use as raw material chlorosilanes for producing semiconductor grade high purity polycrystalline silicon and the like.

A residual solution after the purified chlorosilanes have been separated in the purification step 104 is discharged from the bottom side of the distillation column or the like. This residual solution contains chlorosilanes, the aldehyde compound represented by the general formula Ar—R—CHO used excessively, and the high-boiling substance derived from the donor impurities and acceptor impurities. Among these, the chlorosilanes and the aldehyde compound represented by the general formula Ar—R—CHO can be reused in the impurity conversion step 103.

Figure 2:
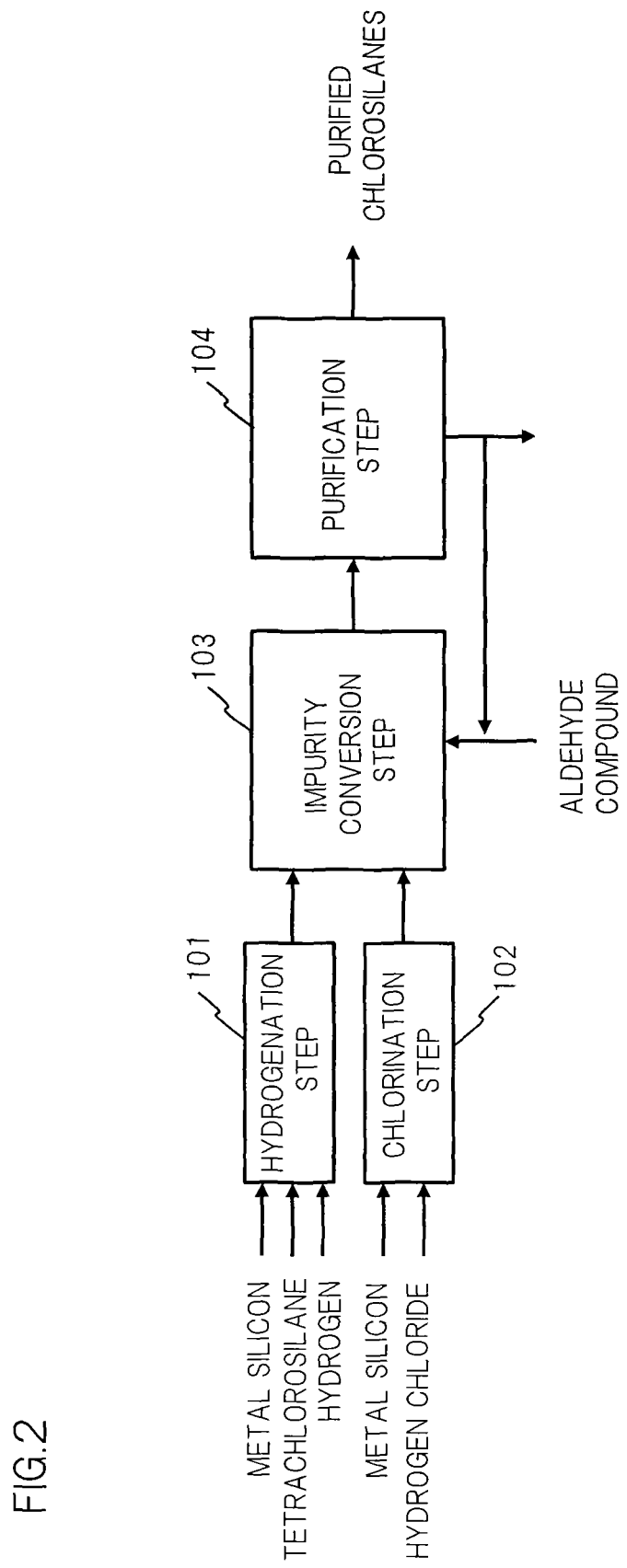
FIG. 2 is a block diagram showing an embodiment of reusing a residual solution after purified chlorosilanes have been separated in a separation step, in an impurity conversion step.

FIG. 2 is a block diagram showing an embodiment of reusing the residual solution after the purified chlorosilanes have been separated in the purification step 104, in the impurity conversion step 103. In this embodiment, at least a part of the residual chlorosilane distillate after the electronic-grade chlorosilanes have been separated in the purification step 104 is supplied to the impurity conversion step 103 as at least a part of the aldehyde compound (residual distillate supplying step). Such reuse not only allows effective use of the chlorosilanes in the residual solution, but also allows reduction in the amount of the aldehyde compound supplied from the outside by the amount of the aldehyde compound to be resupplied to the separation step 103.

Figure 3:
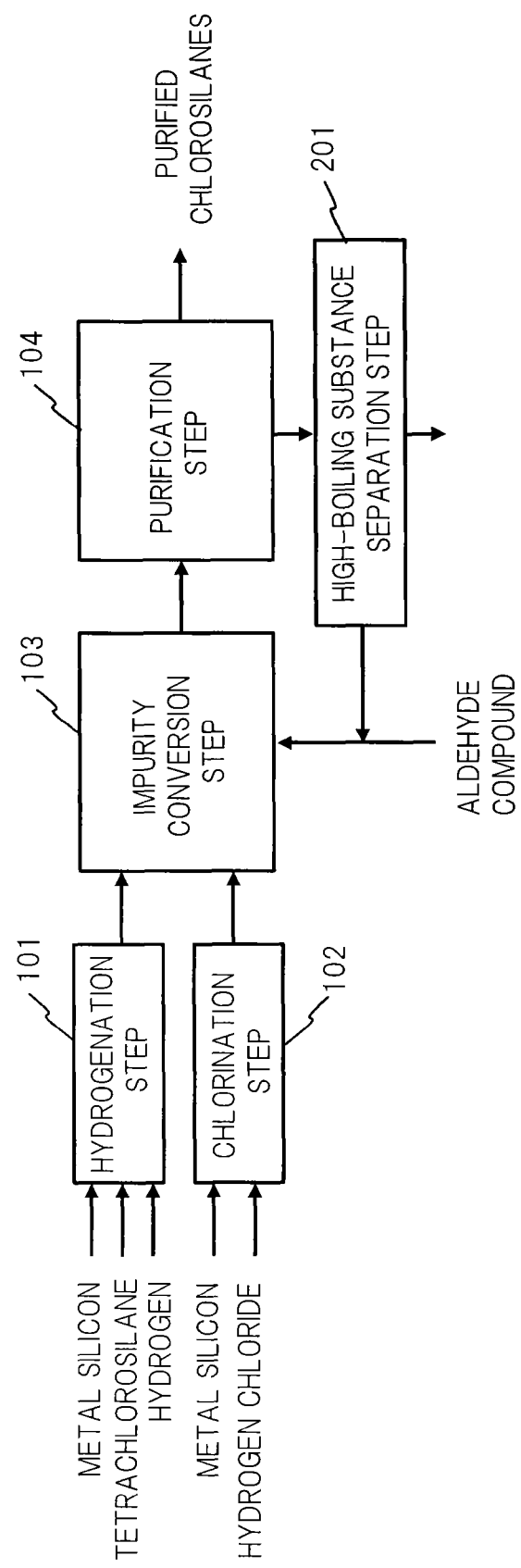
FIG. 3 is a block diagram of an embodiment of providing a high-boiling substance separation step for separating a residual solution into a fraction mainly comprising an aldehyde compound and chlorosilanes and a fraction mainly comprising a high-boiling substance, before the residual solution is supplied to the impurity conversion step.

Note that, before supplying the residual solution to the impurity conversion step 103, there may be previously provided a high-boiling substance separation step 201 of separating a fraction mainly comprising the aldehyde compound and chlorosilanes from the residual chlorosilane distillate after the electronic-grade chlorosilanes have been separated in the purification step 104 and supplying the fraction mainly comprising the aldehyde compound and chlorosilanes to the impurity conversion step 103 as at least a part of the aldehyde compound, as in the embodiment shown in FIG. 3. A distillation column or the like may be used in such high-boiling substance separation step 201. The residual solution mainly comprising a high-boiling substance from which the fraction mainly comprising the aldehyde compound and chlorosilanes have been separated contains the high-boiling substance derived from the donor impurities and acceptor impurities which is a useless substance, and it is possible to recover a useful substance while removing a part of the useless substance out of the system.

Note that if the whole amount of the residual solution is continuously resupplied to the impurity conversion step 103, inconvenience may occur by the concentration of the high-boiling substance of the donor impurities and acceptor impurities. Therefore, it is preferred to adjust the amount of resupply of the residual solution depending on the amount of the donor impurities and acceptor impurities contained in the chlorosilane distillate.

Second Embodiment

FIGS. 4 to 9 are block diagrams for explaining other embodiments of the method for purifying chlorosilanes of the present invention. In the method for purifying chlorosilanes shown in these figures, at least one of a high-boiling fraction separation step 301 and a low-boiling fraction separation step 302 is provided in addition to the steps provided in the first embodiment.

Here, the high-boiling fraction separation step 301 is a step of separating the chlorosilane distillate obtained in the hydrogenation step 101 or chlorination step 102 into a first chlorosilane distillate mainly comprising trichlorosilane and a fraction having a boiling point lower than the boiling point of trichlorosilane and a second chlorosilane distillate mainly comprising tetrachlorosilane and a fraction having a boiling point higher than the boiling point of tetrachlorosilane, and supplying the first chlorosilane distillate to the impurity conversion step 103 or the low-boiling fraction separation step separately provided before the impurity conversion step.

Further, the low-boiling fraction separation step 302 is a step of separating the chlorosilane distillate obtained in the hydrogenation step 101 or chlorination step 102 into a third chlorosilane distillate mainly comprising a fraction having a boiling point lower than the boiling point of trichlorosilane and a fourth chlorosilane distillate mainly comprising trichlorosilane and a fraction having a boiling point higher than the boiling point of trichlorosilane, and supplying the fourth chlorosilane distillate to the impurity conversion step 103 or the high-boiling fraction separation step separately provided before the impurity conversion step.

Figure 4:
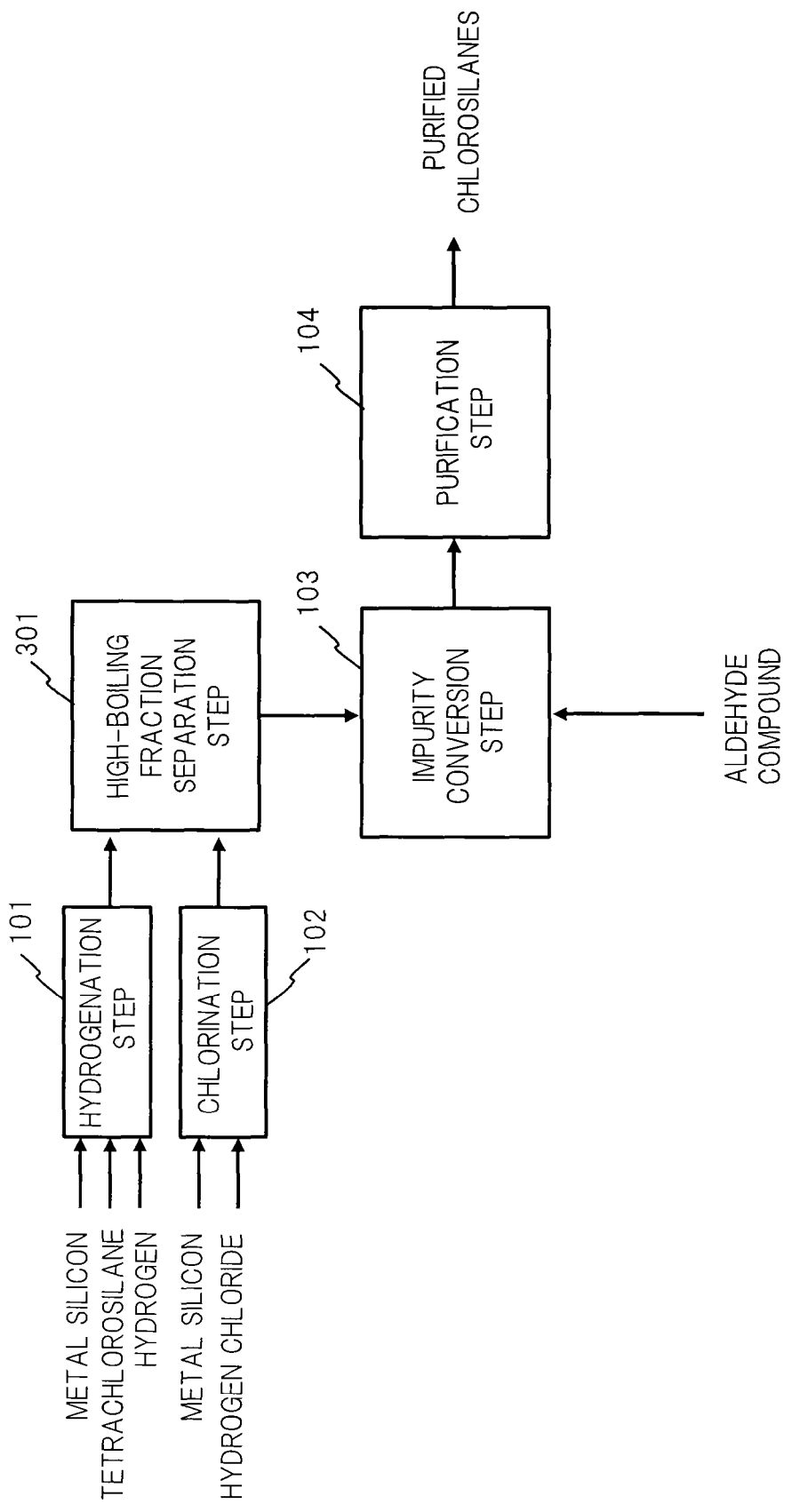
FIG. 4 is a block diagram for explaining another embodiment of the method for purifying chlorosilanes of the present invention.

In the embodiment shown in FIG. 4, the chlorosilane distillate containing trichlorosilane produced in the hydrogenation step 101 and/or chlorination step 102 is purified in the high-boiling fraction separation step 301 to increase the concentration of trichlorosilane in the chlorosilane distillate, and then the resulting chlorosilane distillate is sent to the impurity conversion step 103.

In the chlorosilane distillate produced in the hydrogenation step 101 or chlorination step 102, impurities having a boiling point lower than the boiling point of dichlorosilane and impurities having a boiling point higher than the boiling point of tetrachlorosilane are mixed in addition to dichlorosilane, trichlorosilane, and tetrachlorosilane.

Therefore, the previous separation of tetrachlorosilane and a fraction having a boiling point higher than the boiling point of tetrachlorosilane to thereby increase the concentration of trichlorosilane in the chlorosilane distillate to be sent to the impurity conversion step 103 will be useful in terms of purifying the raw material for producing polycrystalline silicon, for example, in terms of reduction in the apparatus load of the impurity conversion step 103.

In the high-boiling fraction separation step 301 as described herein, the chlorosilane distillate containing trichlorosilane which is sent from the hydrogenation step 101 or chlorination step 102 is separated into chlorosilanes mainly comprising trichlorosilane and a fraction having a boiling point lower than the boiling point of trichlorosilane (for convenience, referred to as the "first chlorosilane distillate") and chlorosilanes mainly comprising tetrachlorosilane and a fraction having a boiling point higher than the boiling point of tetrachlorosilane (for convenience, referred to as the "second chlorosilane distillate").

A distillation column or the like may be used for such separation. For example, the first chlorosilane distillate is removed from the top of the column, and the second chlorosilane distillate is removed from the bottom of the column. Subsequently, the chlorosilanes mainly comprising trichlorosilane and a fraction having a boiling point lower than the boiling point of trichlorosilane (first chlorosilane distillate) are sent to the impurity conversion step 103.

Figure 5:
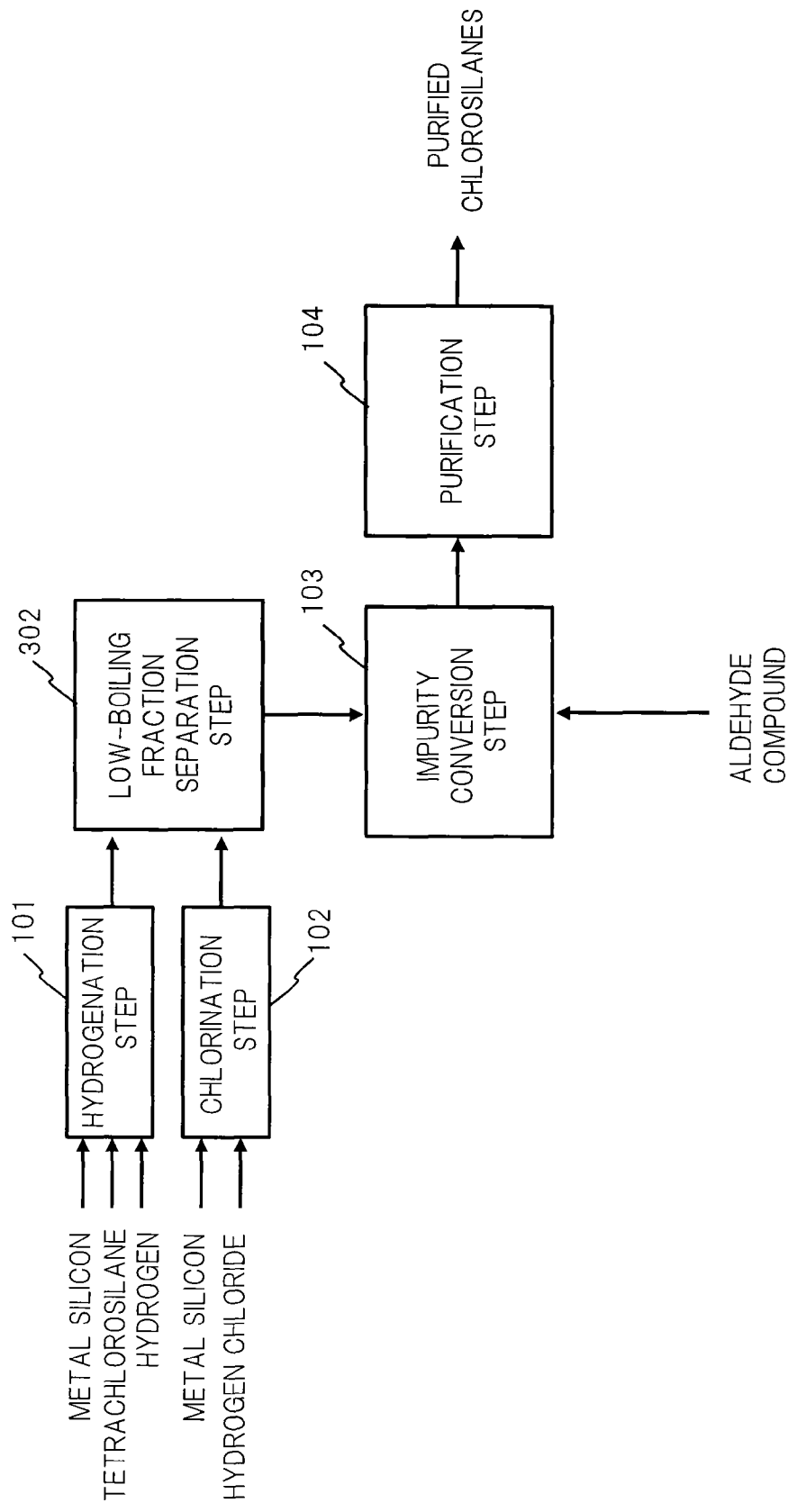
FIG. 5 is a block diagram for explaining another embodiment of the method for purifying chlorosilanes of the present invention.

As in the embodiment shown in FIG. 5, the chlorosilane distillate containing trichlorosilane produced in the hydrogenation step 101 and/or chlorination step 102 may be purified in the low-boiling fraction separation step 302 to increase the concentration of trichlorosilane in the chlorosilane distillate, and then the resulting chlorosilane distillate may be sent to the impurity conversion step 103.

In the low-boiling fraction separation step 302 as described herein, the chlorosilane distillate containing trichlorosilane which is sent from the hydrogenation step 101 or chlorination step 102 is separated into chlorosilanes mainly comprising a fraction having a boiling point lower than the boiling point of trichlorosilane (for convenience, referred to as the "third chlorosilane distillate") and chlorosilanes mainly comprising trichlorosilane and a fraction having a boiling point higher than the boiling point of trichlorosilane (for convenience, referred to as the "fourth chlorosilane distillate").

A distillation column or the like may be used for such separation. For example, the third chlorosilane distillate is removed from the top of the column, and the fourth chlorosilane distillate is removed from the bottom of the column. Subsequently, the chlorosilanes mainly comprising trichlorosilane and a fraction having a boiling point higher than the boiling point of trichlorosilane (fourth chlorosilane distillate) are sent to the impurity conversion step 103.

Figure 6:
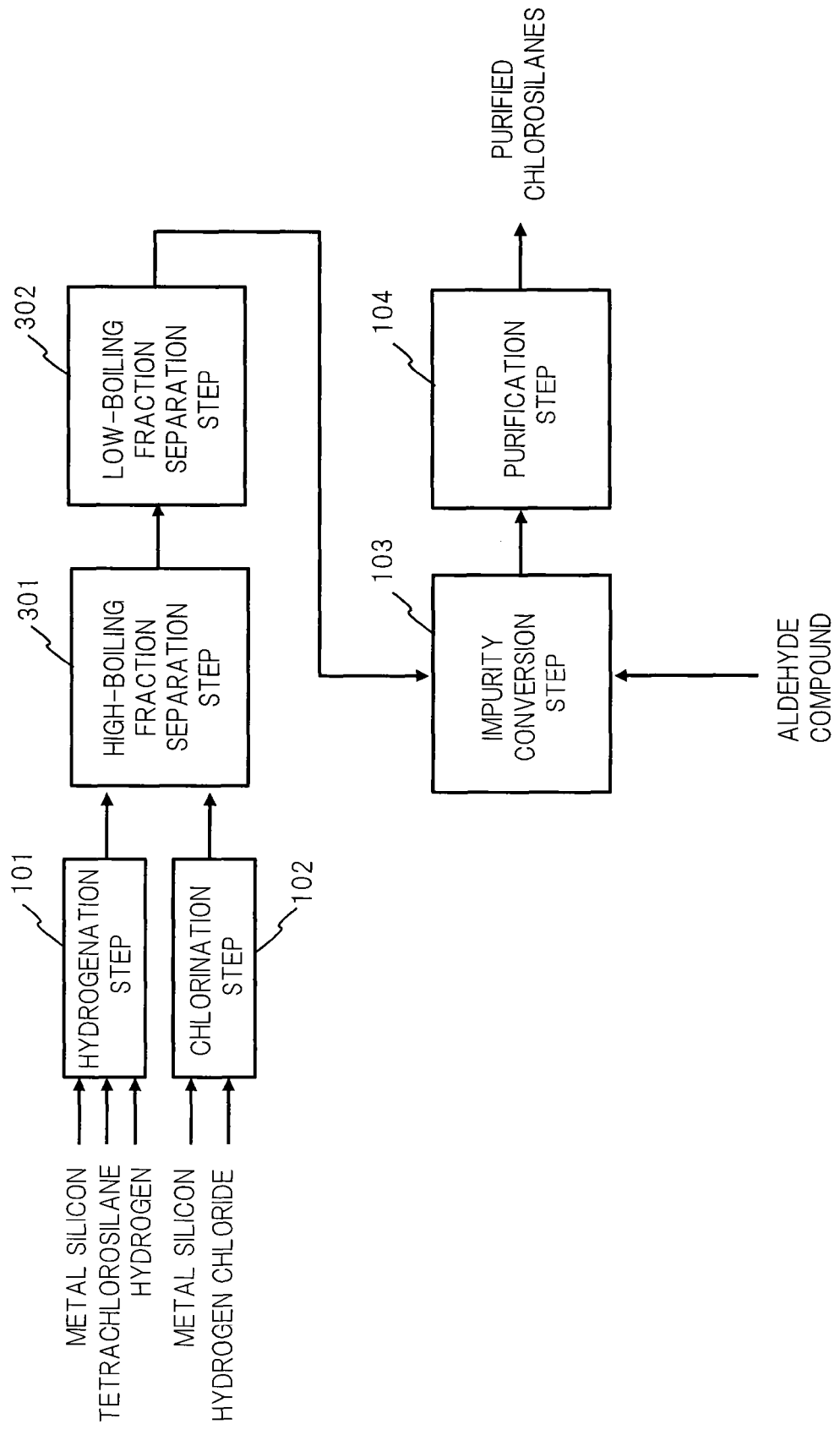
FIG. 6 is a block diagram for explaining another embodiment of the method for purifying chlorosilanes of the present invention.

As in the embodiment shown in FIG. 6, the chlorosilanes mainly comprising trichlorosilane and a fraction having a boiling point lower than the boiling point of trichlorosilane (first chlorosilane distillate) obtained by the treatment in the high-boiling fraction separation step 301 may be further treated in the low-boiling fraction separation step 302 to separate chlorosilanes having a boiling point lower than the boiling point of trichlorosilane such as dichlorosilane to increase further the concentration of trichlorosilane, and then the resulting chlorosilanes may be sent to the impurity conversion step 103.

Figure 7:
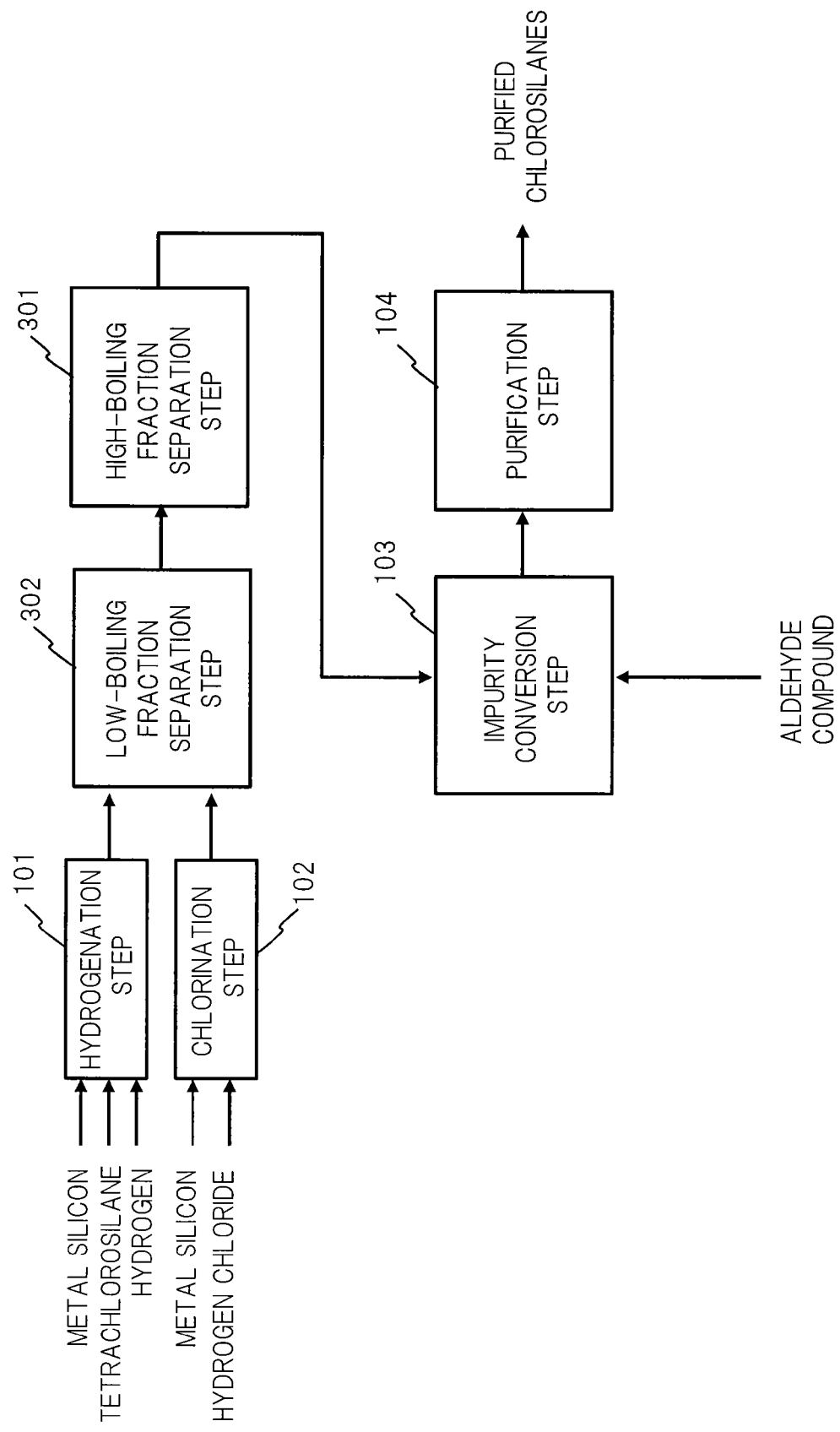
FIG. 7 is a block diagram for explaining another embodiment of the method for purifying chlorosilanes of the present invention.

Further, contrary to the embodiment shown in FIG. 6, the low-boiling fraction separation step 302 may be first provided, and chlorosilanes after the chlorosilanes mainly comprising a fraction having a boiling point lower than the boiling point of trichlorosilane (third chlorosilane distillate) have been separated may be sent to the high-boiling fraction separation step 301 to separate chlorosilanes mainly comprising tetrachlorosilane and a fraction having a boiling point higher than the boiling point of tetrachlorosilane (second chlorosilane distillate), as in the embodiment shown in FIG. 7.

Figure 8:
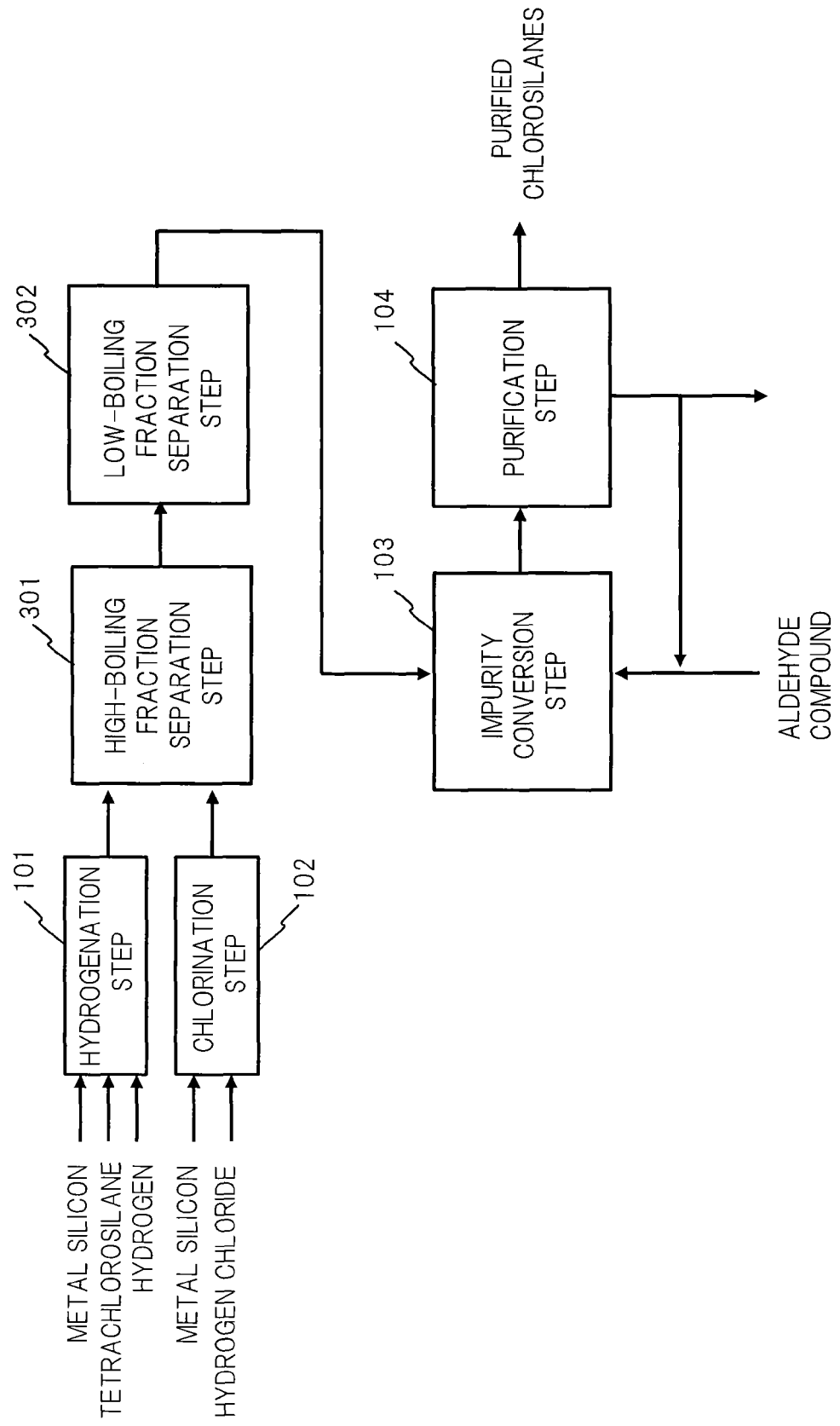
FIG. 8 is a block diagram for explaining another embodiment of the method for purifying chlorosilanes of the present invention.

In the embodiment shown in FIG. 8, the residual solution after the purified chlorosilanes have been separated in the purification step 104 is reused in the impurity conversion step 103, as described with reference to FIG. 2. In this embodiment, at least a part of the residual chlorosilane distillate after the electronic-grade chlorosilanes have been separated in the purification step 104 is supplied to the impurity conversion step 103 as at least a part of the aldehyde compound as described above.

Figure 9:
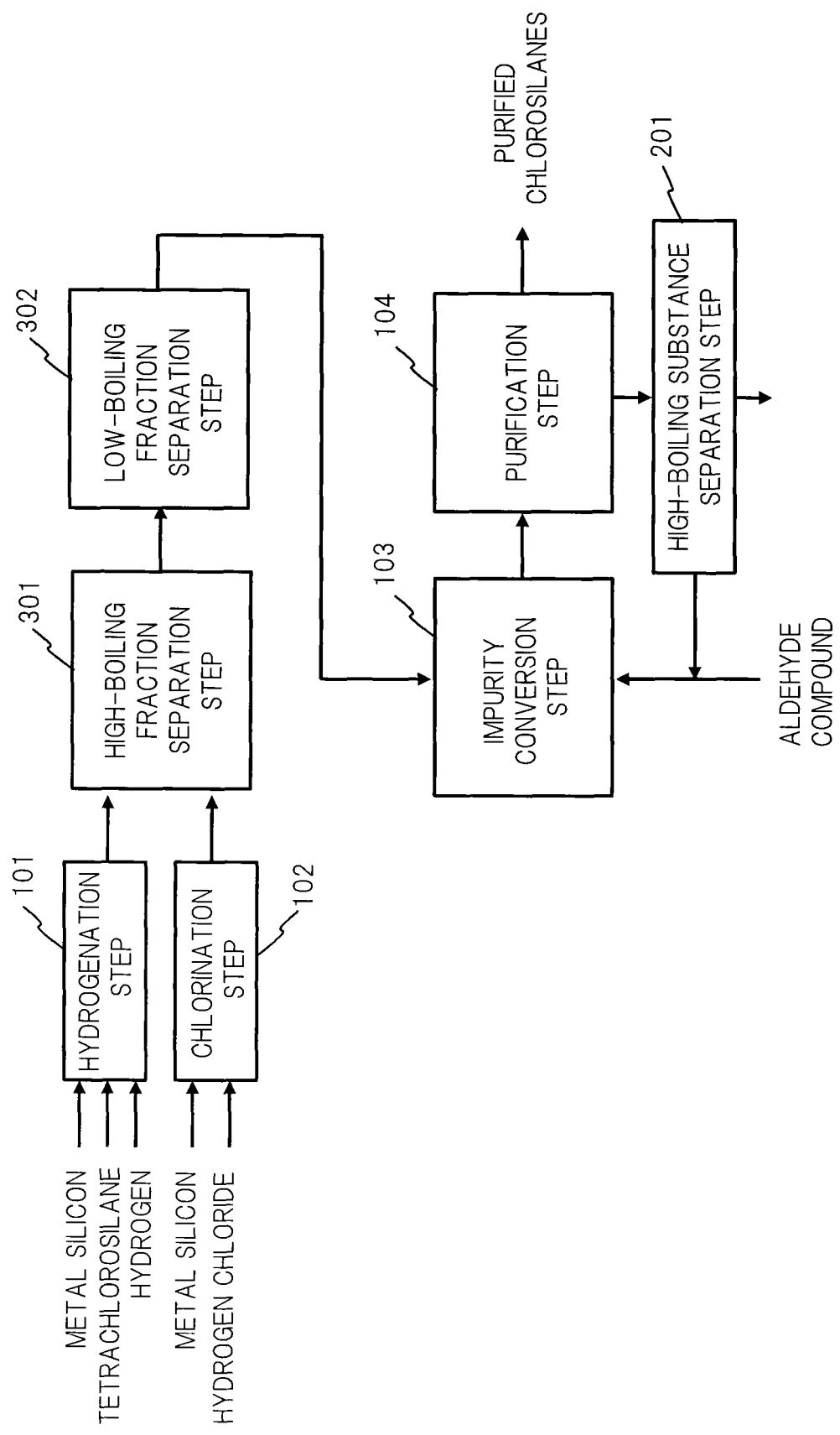
FIG. 9 is a block diagram for explaining another implementation of the method for purifying chlorosilanes of the present invention.

In the embodiment shown in FIG. 9, before supplying the residual solution to the impurity conversion step 103, there is provided a high-boiling substance separation step 201 of previously separating the residual chlorosilane distillate after the electronic-grade chlorosilanes have been separated in the purification step 104 into a fraction mainly comprising the aldehyde compound and chlorosilanes and a fraction mainly comprising a high-boiling substance, and supplying the former (the fraction mainly comprising the aldehyde compound and chlorosilanes) to the impurity conversion step 103 as at least a part of the aldehyde compound, as described with reference to FIG. 3.

EXAMPLES

Hereinafter, the present invention will be more specifically described with reference to Examples and a Comparative Example, but the present invention is not limited to these Examples.

Example 1

A sample vessel was charged with 7,006 g of a chlorosilane distillate mainly comprising trichlorosilane under a room temperature condition of 20 to 30° C., and then thereto was added 27 g of cinnamaldehyde. The mixture was stirred for 1 hour and measured for the concentration of boron and phosphorus in the chlorosilane solution.

The amount of boron and phosphorus in the chlorosilane solution before cinnamaldehyde has been added was 11.5 ppba and 0.2 ppba, respectively. The amount of boron and phosphorus in the chlorosilane solution after stirring was 1.0 ppba and 0.14 ppba, respectively. A mixed solution of cinnamaldehyde and chlorosilane solution after stirring was sufficiently evaporated under nitrogen blowing at normal pressure. A evaporation residue was able to be easily discharged from the vessel, and the residue was found to be a liquid mainly comprising cinnamaldehyde.

Comparative Example 1

Comparative Example 1 was performed under the same conditions as in Example 1 except that benzaldehyde was added instead of cinnamaldehyde. A sample vessel was charged with 6,988 g of chlorosilane distillate mainly comprising trichlorosilane under a room temperature condition of 20 to 30° C. The charged chlorosilane distillate is the same stock solution as used in Example 1. To the charged chlorosilane distillate, was added 22 g of benzaldehyde so as to be the same number of moles as that of cinnamaldehyde used in Example 1. The mixture was stirred for 1 hour and measured for the concentration of boron and phosphorus in the chlorosilane solution.

The amount of boron and phosphorus in the chlorosilane solution after stirring was 0.8 ppba and 0.1 ppba, respectively. A mixed solution of benzaldehyde and chlorosilane solution after stirring was sufficiently evaporated under nitrogen blowing at normal pressure. A evaporation residue was not able to be discharged from the vessel. When the vessel was opened and the evaporation residue was observed, it was found to be a black solid.

Examples 2 to 4

Examples 2 to 4 were each performed under the same conditions as in Example 1 except that an aldehyde compound as shown in Table 1 was added instead of cinnamaldehyde. A sample vessel was charged with a chlorosilane distillate mainly comprising trichlorosilane under a room temperature condition of 20 to 30° C. The charged chlorosilane distillate is the same stock solution as used in Example 1. To the charged chlorosilane distillate, was added each aldehyde compound so as to be the same number of moles as that of cinnamaldehyde used in Example 1. The mixture was stirred for 1 hour and measured for the concentration of boron and phosphorus in the chlorosilane solution. The amount of boron and phosphorus in the chlorosilane solution after stirring is shown in Table 1. A mixed solution of each aldehyde and chlorosilane solution after stirring was sufficiently evaporated under nitrogen blowing at normal pressure. A evaporation residue was able to be easily discharged from the vessel, and the residual solution was found to be a liquid mainly comprising each aldehyde.

TABLE 1

| Example | Aldehyde compound | Amount of chlorosilane distillate charged | Amount of aldehyde compound added | Boron concentration | Phosphorus concentration |
|---|---|---|---|---|---|
| 2 | α-methylcinnamaldehyde | 7,040 g | 30 g | 0.6 ppba | 0.07 ppba |
| 3 | α-pentylcinnamaldehyde | 7,018 g | 42 g | 0.4 ppba | 0.07 ppba |
| 4 | α-hexylcinnamaldehyde | 7,006 g | 45 g | 0.5 ppba | 0.14 ppba |

Example 5

Chlorosilanes were purified in the facilities shown in the block diagram of FIG. 3. In the impurity conversion step 103, α-methylcinnamaldehyde was added to a chlorosilane distillate mixed solution comprising 70% of trichlorosilane and 30% of tetrachlorosilane so that the α-methylcinnamaldehyde would be 1,000 times the amount of boron in the mixed solution in terms of moles. The chlorosilane distillate to which α-methylcinnamaldehyde has been added was sent to the purification step 104 to be subjected to separation in the distillation column. Purified chlorosilanes mainly comprising trichlorosilane were obtained from the top of the distillation column. When polysilicon was produced using the purified chlorosilanes as a raw material and measured for the resistivity thereof, it was found to be as high as 3,500 Ωcm in the N-type. The residual solution discharged from the bottom of the distillation column in the purification step 104 was, following separation of α-methylcinnamaldehyde in the high-boiling substance separation step 201, resupplied to the impurity conversion step 103.

The electronic-grade chlorosilanes obtained by the present invention is not only useful as a raw material for producing polycrystalline silicon for semiconductor applications, but also useful as a raw material for producing polycrystalline silicon for solar cell applications, for forming a silicon oxide film, for forming a polycrystalline silicon film, for forming a silicon compound thin film, or for producing an epitaxial wafer.

INDUSTRIAL APPLICABILITY

The present invention provides a technique of removing donor impurities and acceptor impurities from a chlorosilane distillate to reduce the content of these impurities.

REFERENCE SIGNS LIST

101 Hydrogenation Step
102 Chlorination Step
103 Impurity Conversion Step
104 Purification Step
201 High-boiling Substance Separation Step
301 High-boiling Fraction Separation Step
302 Low-boiling Fraction Separation Step

The invention claimed is:
1. A method for purifying a chlorosilane, the method comprising:
(A) hydrogenating a chlorosilane mainly comprising tetrachlorosilane with hydrogen in the presence of a metal-grade silicon to obtain a chlorosilane distillate comprising trichlorosilane, or
chlorinating a metal-grade silicon with hydrogen chloride to obtain a chlorosilane distillate comprising trichlorosilane;
(B) treating the chlorosilane distillate obtained in (A) with an aldehyde compound, which converts donor impurities and acceptor impurities in the chlorosilane distillate to a high-boiling substance; and
(C) separating an electronic-grade chlorosilane from the chlorosilane distillate which has been subjected to the treating, and recovering the electronic-grade chlorosilane,
wherein said aldehyde compound is cinnamaldehyde.
2. The method of claim 1, further comprising:
(D) supplying at least a part of a residual chlorosilane distillate after the electronic-grade chlorosilane has been separated in (C) to (B) as at least a part of the aldehyde compound.
3. The method of claim 1, further comprising:
(E) separating a fraction mainly comprising the aldehyde compound and the chlorosilane from a residual chlorosilane distillate after the electronic-grade chlorosilane has been separated in (C) and supplying the fraction mainly comprising the aldehyde compound and the chlorosilane to (B) as at least a part of the aldehyde compound.
4. The method of claim 1, further comprising:
(F) separating the chlorosilane distillate obtained in (A) into a first chlorosilane distillate mainly comprising trichlorosilane and a fraction having a boiling point lower than the boiling point of trichlorosilane and a second chlorosilane distillate mainly comprising tetrachlorosilane and a fraction having a boiling point higher than the boiling point of tetrachlorosilane, and supplying the first chlorosilane distillate to (B).
5. The method of claim 4, further comprising:
(G) further separating the first chlorosilane distillate into a distillate mainly comprising trichlorosilane and a distillate mainly comprising a fraction having a boiling point lower than the boiling point of trichlorosilane, and supplying the distillate mainly comprising trichlorosilane to (B).
6. The method of claim 1, further comprising:
(H) separating the chlorosilane distillate obtained in (A) into a third chlorosilane distillate mainly comprising a fraction having a boiling point lower than the boiling point of trichlorosilane and a fourth chlorosilane distillate mainly comprising trichlorosilane and a fraction having a boiling point higher than the boiling point of trichlorosilane, and supplying the fourth chlorosilane distillate to (B).
7. The method of claim 6, further comprising:
(I) further separating the fourth chlorosilane distillate into a distillate mainly comprising trichlorosilane and a distillate mainly comprising a fraction having a boiling point higher than the boiling point of trichlorosilane, and supplying the distillate mainly comprising trichlorosilane to (B).

8. The method of claim 1, wherein a treatment temperature in (B) is 0° C. to 150° C.

9. The method of claim 1, wherein the treating (B) is performed by adding the aldehyde compound in an amount equal to or greater than a stoichiometric amount of the donor impurities and acceptor impurities in the chlorosilane distillate.

10. A method for producing polycrystalline silicon, for forming a silicon oxide film, for forming a polycrystalline silicon film, for forming a silicon compound thin film, or for producing an epitaxial wafer, the method comprising the method of claim 1.

11. The method of claim 1, comprising hydrogenating a chlorosilane mainly comprising tetrachlorosilane with hydrogen in the presence of a metal-grade silicon to obtain a chlorosilane distillate comprising trichlorosilane.

12. The method of claim 1, comprising chlorinating a metal-grade silicon with hydrogen chloride to obtain a chlorosilane distillate comprising trichlorosilane.

13. The method of claim 2, further comprising:
(F) separating the chlorosilane distillate obtained in (A) into a first chlorosilane distillate mainly comprising trichlorosilane and a fraction having a boiling point lower than the boiling point of trichlorosilane and a second chlorosilane distillate mainly comprising tetrachlorosilane and a fraction having a boiling point higher than the boiling point of tetrachlorosilane, and supplying the first chlorosilane distillate to (B).

14. The method of claim 3, further comprising:
(F) separating the chlorosilane distillate obtained in (A) into a first chlorosilane distillate mainly comprising trichlorosilane and a fraction having a boiling point lower than the boiling point of trichlorosilane and a second chlorosilane distillate mainly comprising tetrachlorosilane and a fraction having a boiling point higher than the boiling point of tetrachlorosilane, and supplying the first chlorosilane distillate to (B).

15. The method of claim 2, further comprising:
(H) separating the chlorosilane distillate obtained in (A) into a third chlorosilane distillate mainly comprising a fraction having a boiling point lower than the boiling point of trichlorosilane and a fourth chlorosilane distillate mainly comprising trichlorosilane and a fraction having a boiling point higher than the boiling point of trichlorosilane, and supplying the fourth chlorosilane distillate to (B).

16. The method of claim 3, further comprising:
(H) separating the chlorosilane distillate obtained in (A) into a third chlorosilane distillate mainly comprising a fraction having a boiling point lower than the boiling point of trichlorosilane and a fourth chlorosilane distillate mainly comprising trichlorosilane and a fraction having a boiling point higher than the boiling point of trichlorosilane, and supplying the fourth chlorosilane distillate to (B).

17. The method of claim 13, further comprising:
(G) further separating the first chlorosilane distillate into a distillate mainly comprising trichlorosilane and a distillate mainly comprising a fraction having a boiling point lower than the boiling point of trichlorosilane, and supplying the distillate mainly comprising trichlorosilane to (B).

* * * * *